F. J. WAGNER.
FILTER PRESS.
APPLICATION FILED MAY 9, 1913.
1,119,736.
Patented Dec. 1, 1914.
3 SHEETS—SHEET 1.
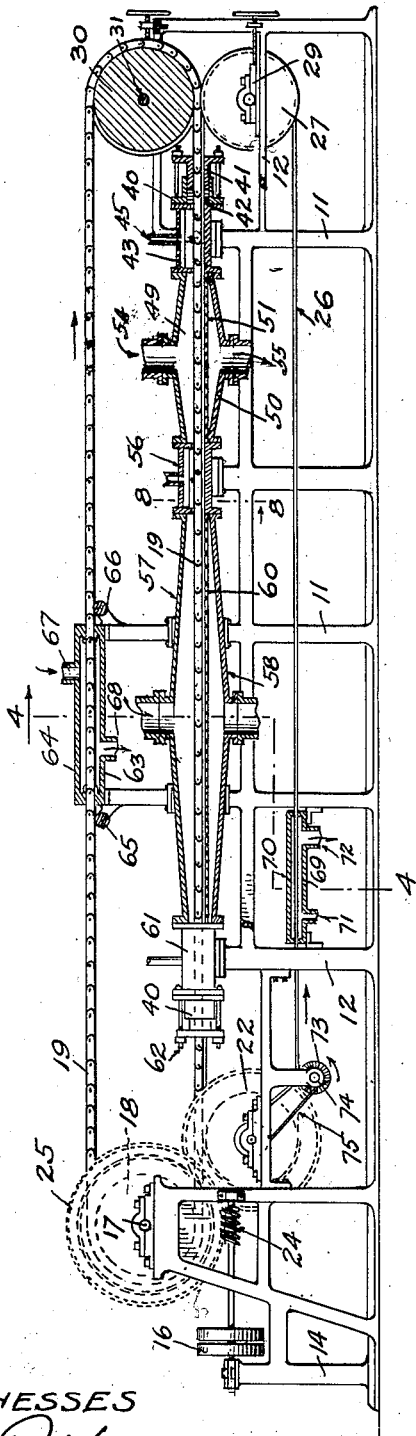
WITNESSES
W. P. Keene
Marie Battey
INVENTOR
FREDERIC J. WAGNER
BY Hazard Krause
ATTORNEYS.

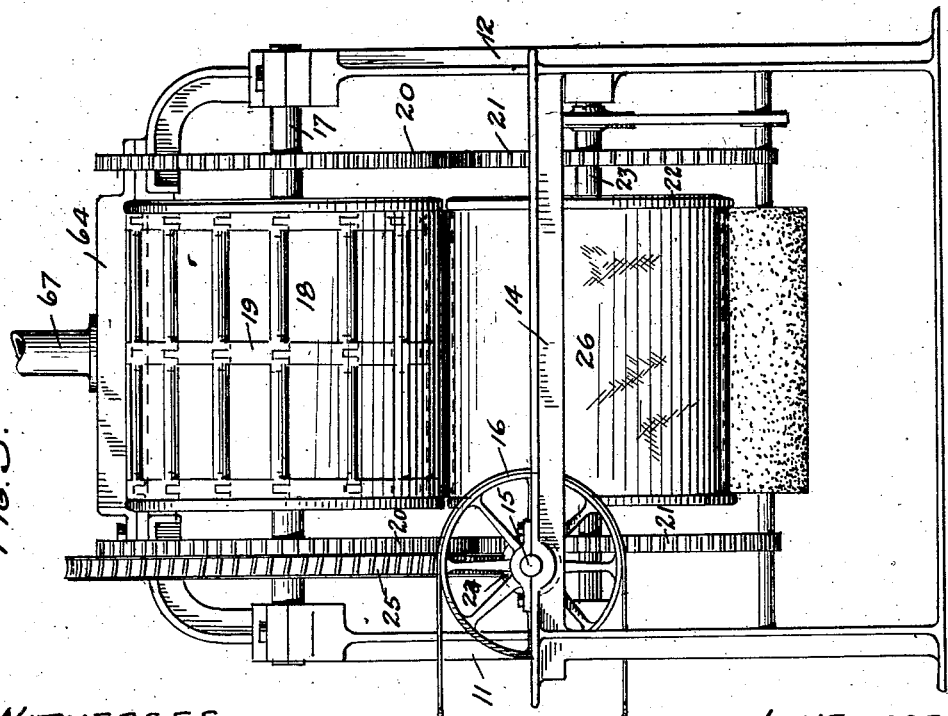

F. J. WAGNER.
FILTER PRESS.
APPLICATION FILED MAY 9, 1913.
1,119,736.
Patented Dec. 1, 1914.
3 SHEETS—SHEET 3.
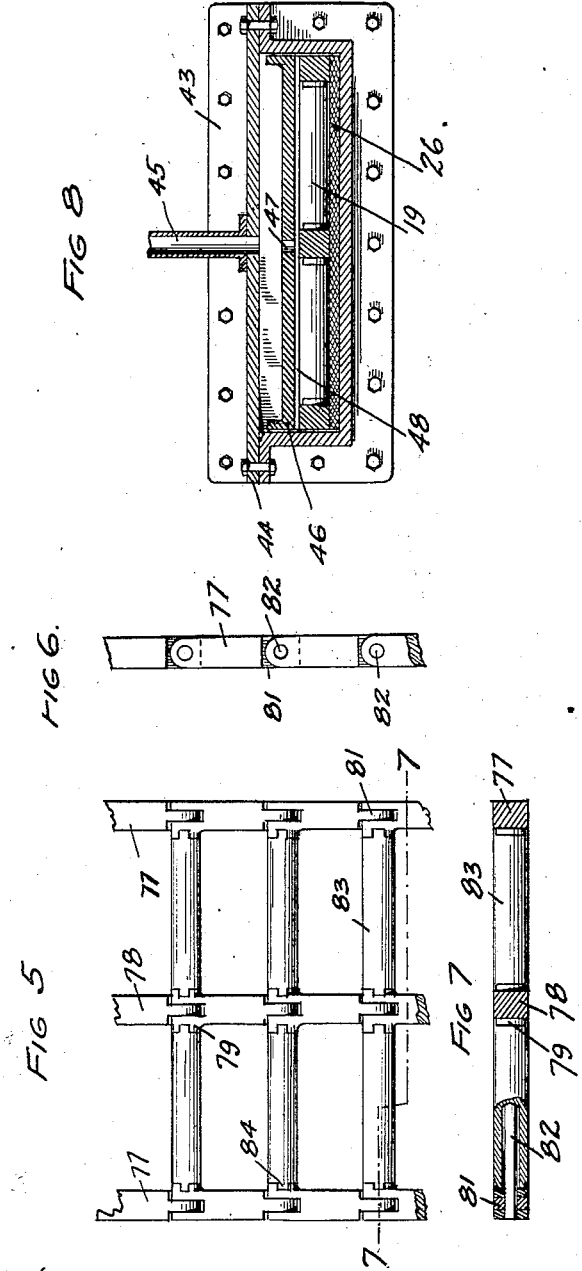
WITNESSES
W. T. Keene
Marie Battey
INVENTOR
FREDERIC J. WAGNER
BY
Hazard & Strauss
ATTORNEYS

UNITED STATES PATENT OFFICE.

FREDERIC J. WAGNER, OF SANTA ANA, CALIFORNIA.

FILTER-PRESS.

1,119,736.     Specification of Letters Patent.     Patented Dec. 1, 1914.

Application filed May 9, 1913. Serial No. 766,483.

*To all whom it may concern:*

Be it known that I, FREDERIC J. WAGNER, a citizen of the United States, residing at Santa Ana, in the county of Orange and State of California, have invented a new and useful Improvement in Filter-Presses, of which the following is a specification.

This invention relates to filter presses, and the principal object is to provide a filtering press having a continuous operation with a plurality of conveyer means.

It is also an object to provide a filter press with a continuous conveyer and means to hold the filtered material in positive relation thereto while subjected to a succession of filtering processes.

It is also an object to provide a continuous filter press with a casing having a plurality of filtering chambers separated by pressure packing boxes, so that the material is prevented from escaping at the points of introduction of the endless conveyer.

It is also a further object to provide means for cleaning the combined conveyer elements together with means to adjust the tension of the coöperating conveyers independently.

In the drawings accompanying this specification and forming herewith the application for Letters Patent, Figure 1 is a sectional elevation of the apparatus, portions of the structure being shown in side elevation. Fig. 2 is a plan view, parts of the conveyer being broken away on its upper portion to clearly show the filtering chambers. Fig. 3 is an end elevation of the driving end of the machine. Fig. 4 is a section on the line 4—4 of Fig. 1, viewed in the direction indicated by the arrows. Fig. 5 is a plan view of a section of the chain. Fig. 6 is an end view thereof. Fig. 7 is a section on the line 7—7 of Fig. 5. Fig. 8 is a section on the line 8—8 of Fig. 1. Fig. 9 is a detail perspective of the middle link of the conveyer chain. Fig. 10 is a detail perspective view of one of the connecting bars.

More specifically in the drawings, 11 and 12 designate the longitudinal side frames of the machine, provided with the end frame 14, in which is journaled one end of the drive shaft 15, provided with the idler and driving pulleys 16. Mounted adjacent the drive shaft 15, and transversely of the frame, is the shaft 17, on which is secured the drum 18, provided with suitable flanges to retain and support at this end of the machine the endless chain 19. To each end of the drum are secured gear wheels 20, which are adapted to mesh with gear wheels 21 of the same diameter mounted on the drum 22 which is provided with a shaft 23, the two drums being in parallel relation and so journaled in the frame that they are driven at the same speed. To provide means for driving these drums and the conveyers supported thereon, connections are interposed between the drive shaft 15 and the drum 18, which are preferably shown as a worm 24 meshing in a large worm wheel 25 keyed to the shaft 17 of the drum 18. The drum 22 is adapted to carry and support one end of the conveyer belt 26, the opposite ends of this belt being supported and carried around the drum 27, which is provided with a shaft 28 carried in the sliding bearings 29, suitable flanges being provided on this drum, so that the belt is properly guided thereon. The endless chain 19 is also carried over a second drum 30 provided with suitable flanges, the drum being keyed to the shaft 31, which is mounted in suitable sliding journals 32, the two drums at this end of the machine being so disposed that the outer surfaces of chain and belt are brought together intermediate of the two drums.

To slide the journals 29 and 32 so that proper tension may be placed upon the conveyer belt chain, threaded shafts 33 are provided, which are secured to the journals in any well known manner, their outer ends extending through and engaging in the treaded blocks 34 and terminating in handles or hand-wheels 35, so that by turning the latter, the threaded shaft connected to the journals, will be moved in relation to the end frame and provide for wear, and maintain a suitable tension on the conveyer belt and chain. The drums 18 and 22 are also so disposed that the belt is brought in contact with the lower portion of the conveyer chain, the drum 18 being preferably driven clockwise so that the chain travels in the drawing from left to right, or the upper portion travels from drum 18 to drum 30, the travel through the casing forming the filtering chambers being from the drum 30 to the drum 18.

The casing forming the inclosure for the approximated section of the belt and chain is supported by the side frames 11 intermediate of the adjacent pairs of rolls and preferably occupying a horizontal position.

The first section of the casing consisting of a packing box 40 having a sliding and adjustable closure 41 therefor, provided with packing rings or plates 42 of any suitable material. These packing rings or plates are forced in contact with the outer face of the steam or pressure box 43 through which the belt and chain also travel. This pressure box is of a general rectangular configuration provided with an apertured cover 44, the space inclosed thereby being of somewhat greater vertical height than the combined height of the belt and chain supported on the floor of the box. The pressure pipe 45 is led into the aperture in the top plate, and the pressure is exerted upon the plate 46 which acts as a piston movably mounted within the box so that the belt and chain are sufficiently held in contact at this point to prevent the escape of the material to be filtered through this box. The plate 46 is also preferably provided with an aperture 47 which communicates with a tranverse groove 48, this latter being provided to allow a certain amount of the pressure medium, which is usually and preferably steam, to escape to and around the chain and belt.

The next section of the casing is directly connected to the steam box 43 by means of suitable flanged ends, and is formed preferably of two hopper shaped castings 49 and 50, through which the chain and belt are adapted to freely slide, the belt resting upon the horizontally disposed screen plate 51 forming an efficient support for the belt, but not preventing the escape of fluids therethrough, this plate being supported upon horizontal flanges 52 and held thereto by means of the plates 53 suitably secured to the side of the lower section of the casing, the chamber inclosed thereby being adapted to receive the material to be filtered through the aperture 54, an exit being provided for the filtrate through the aperture 55.

The next section of the casing is a steam box 56 similar in construction to the box 43, but without a packing box, pressure applied at this point being slightly greater than the pressure maintained on the product to be filtered, introduced into the previous chamber described.

The next section of the casing is preferably of greater length than the first described, but is of similar construction, having two apertured hoppers 57 and 58 supporting the screened plate 60, this chamber being adapted more particularly for the final step of the process of extracting all the soluble elements from the material to be filtered which forms a cake intermediate of the links of the chain.

The next section of the casing is formed by a duplicate 61 of the pressure box 43 and packing box 40 together with the adjusting screws 62 therefor similar to the construction at the oppositely disposed end of the sections forming the filtering casing.

To properly clean the chain and belt after each engagement in the filtering casing, and to efficiently remove those portions of the cake which cling to the latter, washing chambers are provided, that for the chain being mounted over the central portion, consisting of a box 63 having an apertured cover 64. The chain as it enters this box is suitably supported upon a roller 65, placed adjacent the opening into the box, a similar roller 66 being provided adjacent the exit opening for the chain, so that the long stretch between the rolls is properly supported, and friction eliminated as the chain enters and makes its exit from the washing box. An inlet pipe 67 connects with the aperture in the cover, and a suitable outlet 68 is provided in the floor of the box.

A similar washing box 69 is provided for the belt, having a cover 70; the inlet and outlet in this box being preferably through the bottom, and the washing fluid only comes in contact with the lower surface of the belt at this point, which forms a support for the cake as the belt passes through the filtering casing, the inlet being designated 71 and outlet therefor 72.

The cake normally falls from the belt as the latter turns around the drum 22 into a suitable conveyer or hopper, not shown, and to assist this action and remove the more adherent materials, a cylindrical brush 73 is provided mounted on a shaft 74, which is driven by a belt or chain 75 carried over a pulley 76 on the shaft 23; the brush being so arranged that it is revolved against the movement of the belt, and brushes off all adherent particles previous to the washing of the belt in the box 69.

The belt is formed of an endless fabric of suitable thickness to permit the passage of the fluid carrying the filtrate; the chain being of novel construction and formed of a plurality of parallel disposed links 77, intermediate of which are preferably placed one or more of a series of links 78, which are provided with hubs 79. The links 77 only have hubs on their inner faces, the outer faces being plain, and adapted to form contact with the sides of the filtering casing and the washing box. The hubs 79 are slotted in two planes, the longitudinal plane having a slot 80 which is adapted to receive the tongue 81 formed on the oppositely disposed end of a link of the same configuration, which is adapted to be hinged within the hub by means of hinge pin 82. Slots cut in the end of the hub at right angles to the slot 80 form seats for the tongue 84 formed on the ends of the spacing sleeves 83; these sleeves being adapted to fit closely to the pin 82 carried through the hubs on the links and engage with their tongues 84, the grooves 85 in the hub 79 to form the transverse walls of a pocket adapted to receive the cake, the links forming the end walls, and the belt the floor of this cake pocket.

Hinge pins 82 are shown as plain pins which may be secured in any suitable manner to the end links, so that a smooth face is formed on the outer edges of the chain, and provide an easy fit in the walls of the filtering casing.

In the operation of this machine, power being applied to the drive pulley on the shaft 15, the belt and chain are slowly advanced in adjacent position through the filtering casing, and the product to be filtered, taking for illustration the solution of saccharine material in the processes of preparing sugar from beets or cane together with the large proportion of silicate or milk of lime, is introduced into the first chamber of the casing where all of the insoluble portions are caught upon the floor formed by the belt which is intimately pressed in contact with the screened plate 51, the filtrate carrying the sugar in solution escapes through the orifice 55 to any suitable container. The belt now advances through the pressure box 56, the speed being so timed that the cakes resultant from the filtering process practically fill the pockets in the chain, and the cake is exposed to the action of water introduced through the inlet in the casing 57 where all of the undissolved sugar is carried out, the pressure of the dissolving medium being preferably slightly greater than that in the first filtering chamber, but not in excess of that applied to the pressure box 56 and 61. In traveling through the latter chamber, all the soluble ingredients are eliminated and the resultant cake consisting of calcined carbonates together with sand, and other contaminating ingredients commonly found with the lime when introduced in the process, fall off of the belt, or are removed by the brush 73, and any particles which may become embedded in the fabric, are washed out in the washing box 69. Particles adhering to the roll also fall by gravity, the drum 18 being preferably placed in the position beyond the drum 22 so that this action is assisted by this extension of the chain in a horizontal position beyond the belt, the chain being supported and washed in the washing box 63 provided for it, the current of the fluid passing through the pockets formed by the links and the sleeves.

What I claim is:

1. A filter press, comprising a closed filtration chamber having inlets and outlets, a movable filtering medium passing through said chamber, means to move said medium through said chamber, and means mounted on said chamber to prevent the escape of material from said chamber at the points where the filtering medium enters and leaves said chamber.

2. A filter press, comprising a closed filtration chamber divided into a plurality of compartments each of said compartments having inlets and outlets, an endless belt carrying filtering medium mounted on said chamber, means to rotate said belt and packing boxes mounted on said chambers at the points that said belt enters and leaves said chambers, whereby to prevent the escape of materials introduced for the purpose of filtration.

3. A filter press, comprising a supporting frame, an endless chain belt mounted thereon, an endless belt mounted adjacent to said chain belt, means to contact engaging portions of said belt and said chain belt, and an apertured casing surrounding said contacted portion of said belt and chain belt.

4. A filter press, comprising a supporting frame, driving means mounted on said frame, a plurality of supporting rolls mounted adjacent said driving means, an endless chain belt carried by a pair of said rolls, an endless fabric belt carried by a pair of said rolls, said fabric belt and chain belt adapted to contact intermediate of their rolls, a casing forming a plurality of chambers inclosing said contacting portion of said fabric belt and chain belt, and packing means to segregate chambers in said casing.

5. A filter press, comprising a supporting frame, an upper and lower pair of supporting rolls, an endless chain belt carried by the upper of said pairs of rolls, an endless fabric belt carried by the lower pair of said rolls, a casing forming a plurality of chambers arranged to inclose the adjacent and contacting portions of said belts, means to wash said belts independently of each other, and brush means adapted to engage said fabric belt, and means to drive said belts in unison.

6. A filter press, comprising a supporting frame, an upper and lower pair of supporting rolls, an endless chain belt carried by the upper of said pairs of rolls, an endless fabric belt carried by the lower pair of said rolls, a casing forming a plurality of chambers arranged to inclose the adjacent and contacting portions of said belts, means to wash said belts independently of each other, brush means adapted to engage said fabric belt, means to drive said belts in unison, and means to adjust each of said pairs of rollers to increase or diminish the tension on said belts.

7. A filter press, comprising a supporting frame, driving means mounted on said frame, a plurality of supporting rolls mounted adjacent said driving means, an endless chain belt carried by a pair of said rolls, an endless fabric belt carried by a pair of said rolls, said fabric belt and chain belt adapted to contact intermediate of their rolls, a casing forming a plurality of chambers inclosing said contacting portion of said fabric belt and chain belt, and apertured means to support said contacting portions within said casing.

In witness that I claim the foregoing I have hereunto subscribed my name this 5th day of April, 1913.

FREDERIC J. WAGNER.

Witnesses:
W. P. KEENE,
MARIE BATTEY.